United States Patent
Ozozlu et al.

(10) Patent No.: US 11,356,234 B1
(45) Date of Patent: Jun. 7, 2022

(54) SCHEDULING FULL-DUPLEX TRANSMISSIONS IN 5G NETWORKS

(71) Applicant: Sprint Spectrum LP, Overland Park, KS (US)

(72) Inventors: Akin Ozozlu, McLean, VA (US); Noman Alam, Chantilly, VA (US); Nagi Mansour, Arlington, VA (US); David Rosen, Washington, DC (US)

(73) Assignee: T-Mobile Innovations LLC, Overland Park, KS (US)

( * ) Notice: Subject to any disclaimer, the term of this patent is extended or adjusted under 35 U.S.C. 154(b) by 107 days.

(21) Appl. No.: 16/774,497

(22) Filed: Jan. 28, 2020

(51) Int. Cl.
*H04W 72/04* (2009.01)
*H04W 72/12* (2009.01)
*H04W 28/02* (2009.01)
*H04L 5/14* (2006.01)
*H04L 1/16* (2006.01)

(52) U.S. Cl.
CPC ............. *H04L 5/14* (2013.01); *H04L 1/1642* (2013.01); *H04W 28/0268* (2013.01); *H04W 72/0446* (2013.01); *H04W 72/1278* (2013.01)

(58) Field of Classification Search
None
See application file for complete search history.

(56) References Cited

U.S. PATENT DOCUMENTS

| | | | |
|---|---|---|---|
| 10,736,101 B2 * | 8/2020 | Liao | H04W 72/1205 |
| 10,945,264 B2 * | 3/2021 | Huang | H04L 27/2601 |
| 2016/0080133 A1 * | 3/2016 | Golitschek Edler von Elbwart | H04W 72/0446 370/280 |
| 2016/0233904 A1 * | 8/2016 | Wu | H04L 5/1469 |
| 2017/0055284 A1 | 2/2017 | Min et al. | |
| 2019/0089502 A1 | 3/2019 | Yi et al. | |
| 2019/0342898 A1 * | 11/2019 | Nam | H04W 72/1289 |
| 2020/0221469 A1 * | 7/2020 | Lee | H04L 5/1469 |
| 2020/0259896 A1 * | 8/2020 | Sachs | G07C 9/00174 |
| 2021/0028916 A1 * | 1/2021 | Huang | H04L 5/14 |
| 2021/0100061 A1 * | 4/2021 | Park | H04W 28/0268 |
| 2021/0176610 A1 * | 6/2021 | You | H04W 4/40 |
| 2021/0176735 A1 * | 6/2021 | Deng | H04W 72/087 |
| 2021/0227551 A1 * | 7/2021 | Ly | H04L 5/0094 |

* cited by examiner

*Primary Examiner* — Tri H Phan

(57) ABSTRACT

Scheduling full-duplex transmissions includes configuring adjacent time slots of an air interface resource with different ratios of uplink portions, downlink portions, and flexible portions, scheduling transmissions in each adjacent time slot based on whether or not the transmissions are latency-sensitive or delay-sensitive or control transmissions. The uplink portions, downlink portions, and flexible portions comprise symbols within time slots of a subframe, and can vary based on a numerology. The flexible portions are symbols configured to simultaneously transmit uplink data and downlink data.

17 Claims, 5 Drawing Sheets

---

IDENTIFY FLEXIBLE PORTIONS OF AN AIR INTERFACE RESOURCE
410

↓

SCHEDULE LATENCY-TOLERANT AND/OR DELAY-TOLERANT TRANSMISSIONS IN THE FLEXIBLE PORTIONS
420

SCHEDULING FULL-DUPLEX TRANSMISSIONS IN 5G NETWORKS

TECHNICAL BACKGROUND

As wireless networks evolve and grow, there are ongoing challenges in providing high-quality service to increasing numbers of wireless devices in various coverage areas of a wireless network. radio access technologies (RATs) such as 5G New Radio (NR) are being implemented alongside existing RATs such as 3G and 4G Long Term Evolution (LTE), and wireless devices are increasingly becoming more capable of connecting to these RATs. While channel bandwidths in 4G are static, 5G is capable of deploying various different bandwidths, most of which are higher than 4G bandwidths. Further, as available bandwidths (i.e. frequencies) are increasingly being used to schedule more and more transmissions, wireless networks need to be configured to utilize time-division-duplexing (TDD), enabling uplink and downlink transmissions to be scheduled in the time domain versus the frequency domain. Full duplexing is another approach that provides improvements to shortcomings in the wireless air interface, since it enables certain air interface resources to simultaneously transmit both downlink and uplink data using flexible portions within available time slots. For example, the flexible portions comprise flexible OFDM symbols known in the art, with full-duplexing being used to exploit the orthogonality of these symbols.

However, there are problems associated with utilizing full duplexing in densely populated wireless networks. In particular, with TDD networks, transmissions that are scheduled using flexible symbols are more susceptible to interference caused by other transmissions utilizing the same frequencies (for example, scheduled in neighboring sectors). Existing methods to mitigate this interference are sub-optimal, particularly those that involve muting subframes (or portions thereof) to prevent interference, or those that utilize complex interference coordination techniques that increase overhead in wireless networks due to excessive signaling between access nodes. Further, existing interference mitigation techniques prevent effective usage of the entire available spectrum, thereby reducing a quality of service expected by end-users of wireless devices attached to the network. For example, for certain services requiring guaranteed bit rate (GBR) or throughput, or a low-latency or low-delay (such as, for example, VoIP), mitigating interference or using flexible symbols can negatively impact usage of these services.

OVERVIEW

Exemplary embodiments described herein include systems and methods for scheduling full-duplex transmissions in 5G networks utilizing flexible portions of air interface resources. An exemplary method for scheduling full-duplex transmissions includes identifying a one or more flexible symbols within a time slot associated with an air interface resource, wherein the one or more flexible symbols are capable of transmitting both uplink and downlink data simultaneously, and scheduling a first type of transmission in the one or more flexible symbols, wherein the first type of transmission is any transmission that does not have a low latency requirement. A second type of transmission can be scheduled in the one or more flexible symbols, wherein the second type of transmission is any transmission not associated with control signaling. The time slot further comprises one or more uplink symbols and one or more downlink symbols, the one or more uplink symbols and the one or more downlink symbols being different from the one or more flexible symbols. Further, a third type of transmission can be scheduled in the one or more uplink symbols or the one or more downlink symbols, the third type of transmission being any transmission that has a low latency requirement. Further, the third type of transmission can be any transmission that is delay sensitive. In other words, delay-sensitive, latency-sensitive, or control transmissions are prevented from being scheduled in the flexible portions.

Another exemplary method for scheduling full-duplex transmissions includes configuring a time slot of an air interface resource with an uplink portion, a downlink portion, and a flexible portion, wherein the flexible portion is capable of transmitting both uplink and downlink data, and scheduling transmissions that are not delay-sensitive or latency-sensitive in the flexible portion. The transmissions that are delay-sensitive or latency-sensitive can be scheduled in the uplink or downlink portions. Further, control transmissions can be scheduled in the uplink or downlink portions. Determining whether or not a transmission is delay-sensitive or latency-sensitive can be based on an identifier associated with the transmission. In an exemplary embodiment, the identifier comprises a quality of service (QoS) flow identifier, such as a QFI. In an exemplary embodiment, adjacent time slots of the air interface resource are configured with different ratios of uplink portions, downlink portions, and flexible portions depending on a numerology in use, and transmissions are scheduled in each adjacent time slot based on whether or not the transmissions are latency-sensitive or delay-sensitive.

Further, an exemplary system for scheduling full-duplex transmissions includes a processing node and a processor coupled to the processing node. The processor is configured to perform operations including configuring adjacent time slots of an air interface resource with different ratios of uplink portions, downlink portions, and flexible portions, and scheduling transmissions in each adjacent time slot based on whether or not the transmissions are latency-sensitive or delay-sensitive.

DETAILED DESCRIPTION

Exemplary embodiments described herein include systems and methods for scheduling full-duplex transmissions in flexible subframes. An exemplary scheduler coupled to an access node can selectively assign data packets to different time slots and/or portions thereof based on whether or not the data packets are associated with control transmissions, or real-time delay-sensitive and/or latency-sensitive transmissions). For example, control transmissions and/or delay/ latency-sensitive transmissions (such as voice-over-IP, voice-over-LTE, video-over-LTE) are scheduled in uplink and/or downlink symbols of a slot, whereas any other type of transmissions (such as background uplink/downlink data, etc.) are scheduled in the flexible symbols. Since flexible symbols are more likely to be subject to interference from transmissions using same/adjacent frequencies (e.g. from nearby sectors, access nodes, or wireless networks), the real-time and/or delay/latency-sensitive and control transmissions are unaffected by interference, while background or any other type of transmissions scheduled in the flexible portions do not negatively impact a user's experience even if they are subject to interference.

Thus, an exemplary system for scheduling full-duplex transmissions described herein can be configured to perform operations including configuring adjacent time slots of an air interface resource with different ratios of uplink portions, downlink portions, and flexible portions, and scheduling transmissions in each adjacent time slot based on whether or not the transmissions are latency-sensitive or delay-sensitive or control transmissions. The air interface resource includes a subframe or portions thereof (such as time slots), and the uplink portions, downlink portions, and flexible portions can include symbols within the subframe and/or time slots. These and other embodiments are further described with reference to FIGS. 1-6 below.

Figure 1:
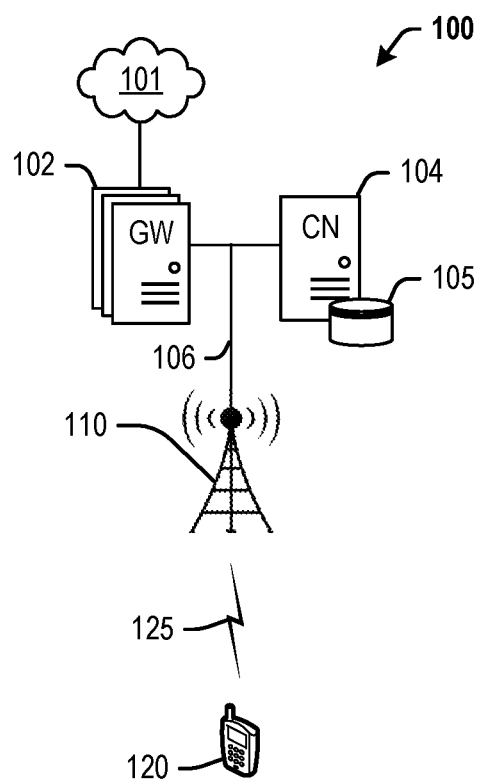
FIG. 1 depicts an exemplary system for scheduling full-duplex transmissions.

FIG. 1 depicts an exemplary system for scheduling full-duplex transmissions. System 100 comprises a communication network 101, gateway node(s) 102, controller node 104, access node 110, and wireless device 120. In other embodiments, any other combination of networks, access nodes, and wireless devices may be evident to those having ordinary skill in the art in light of this disclosure. In this exemplary embodiment, access node 110 may be a macrocell access node configured to deploy a wireless air-interface 125 to which wireless device 120 can attach. For example, access node 110 can include a 5G gNodeB that comprises transceivers and antennae configured to communicate using 5G NR. Further, as described herein, access node 110 (or a processing node communicatively coupled thereto, such as a scheduler) can be configured to perform operations including identifying a one or more flexible portions of air interface resources 125, wherein the one or more flexible symbols are capable of transmitting both uplink and downlink data simultaneously, and scheduling a first type of transmission to/from wireless device 120 in the one or more flexible symbols. The type of transmission can be determined based on a quality of service (QoS) identifier, and the QoS identifier can be associated with a latency requirement of the transmission.

In an exemplary embodiment, the QoS identifier comprises a QoS flow identifier (QFI). Whereas in 4G long-term evolution (LTE) networks, QoS is based on bearers. For example, an LTE bearer is a transmission path through the infrastructure and radio interface with a defined capacity, latency and packet loss. Tools such as Access Class Barring (ACB), Allocation and Retention Priority (ARP), and QoS Class Identifier (QCI) help in managing QoS in 4G LTE networks. Each QCI value can have different attributes such as priority, packet delay budget, and packet error loss, which can be considered as providing a guaranteed service level for users of wireless devices such as wireless device 120. Whereas, in 5G, QoS is flow based, in that packets are classified and marked using QFIs. The 5G QoS flows are mapped in to Data Radio Bearers (DRBs) unlike in 4G LTE where mapping is one to one between EPC and radio bearers. Further, since 5G networks are engineered to be more capable of providing higher bitrates (for applications such as video-over-IP, gaming, etc). that require a guaranteed bit rate and low latency, QoS flow types can be grouped into guaranteed bit rate (GBR) and non-GBR. Further, standardized 5G QoS Identifier (5QI) values are specified for services that are assumed to be frequently used in 5G networks and thus benefit from optimized signaling by using standardized QoS characteristics. Dynamically assigned 5QI values which require a signaling of QoS characteristics as part of the QoS profile can be used for services for which standardized 5QI values are not defined.

Thus, as described herein, GBR traffic is scheduled in non-flexible portions of the air interface 125 (such as dedicated uplink and/or downlink symbols), and non-GBR traffic is scheduled in the flexible portions of the air interface 125. In an exemplary embodiment, resources within air interface 125 comprise frequency-time resources, such as subframes. Further, each subframe include a plurality of time slots, with different subframes having different numbers of timeslots based on a numerology. For example, subframes of a different numerology have different subcarrier spacings and symbol length. In other words, the slot length changes depending on numerology, and gets shorter as subcarrier spacing gets wider, owing to the properties inherent to OFDM wireless air resources. Regardless, each timeslot has the same number of symbols as further illustrated below with reference to FIG. 6. Further, the different time slots can be configured with different ratios of uplink symbols, downlink symbols, and flexible symbols. This concept is referred to as "slot format" which indicates how each symbol within a single slot is used. Whereas in LTE TDD networks, if a subframe (equivalent to a Slot in 5G NR) is configured for downlink or uplink transmissions, all of the symbols within the subframe are used for downlink or uplink respectively. In contrast, in 5G NR, the symbols within a slot can be configured in various ways, i.e. with different ratios of uplink symbols, downlink symbols, and flexible symbols that are arranged adjacent to each other. Theoretically there may be near-infinite possible combinations of downlink symbols, uplink symbols, and flexible symbols in a slot, $3^{rd}$ generation partnership project (3GPP) provides 61 predefined symbol combinations within a slot, that are referred to as slot formats. The various formats (including different allocations of flexible symbols that can be configured for uplink, downlink, or full-duplex, i.e. simultaneous uplink and downlink transmissions) enable more efficient TDD operation.

Further, as described above, flexible portions may be susceptible to interference from similar-or-same-frequency transmissions on other channels or networks. Thus, any GBR transmission is not scheduled in flexible symbols, while non-GBR transmissions can be scheduled in the flexible symbols. Further, since control signaling, particularly for GBR transmissions and/or enhanced mobile broadband (eMBB) transmissions requires low latency and/or delay, such control transmissions can also be scheduled on dedicated uplink/downlink symbols instead of flexible symbols. In other words, delay-sensitive, latency-sensitive, or control transmissions are prevented from being scheduled in the flexible portions. This ensures that services such as video-over-IP (ViIP), voice-over-IP (VoIP), video-over-LTE (ViLTE), voice-over-LTE (VoLTE), and other real-time services associated with a guaranteed bit rate (GBR) maintain a quality of service that is associated with their respective QoS identifier (such as QCI, QFI, etc.).

Further, the data may be associated with a minimum block error ratio (BLER) requirement. For example, BLER measurements are used in LTE/4G/5G networks to measure the in-sync or out-of-sync indication during radio link monitoring. Thus, BLER is defined as the ratio of the number of erroneous blocks received to the total number of blocks sent, with an erroneous block defined as a Transport Block, the cyclic redundancy check (CRC) of which is wrong, and measurements of which can be used to determine how to configure additional air-interface resources in the wireless network. Further, additional air-interface resources can be configured based on real-time measurements of error rates that can reflect how the scheduling of different types of data packets is performed. For example, if certain transmissions are associated with a minimum block error ratio (BLER) requirement. (i.e. the ratio of the number of erroneous blocks received to the total number of blocks sent) the measurements can be used to determine how to configure additional air-interface resources in the wireless network. Additional subframes with different numerologies, and additional slot formats can be used depending on whether or not the aforementioned scheduling methods can continue providing the GBR transmissions described herein. For example, increased numbers of flexible symbols can be configured into future time slots of different formats based on monitoring QFI flows and hybrid automated request (HARQ) transmissions and BLER rates. This can be performed in real-time as the measurements are made and different types of traffic being scheduled in each slot.

Access node 110 can be any network node configured to provide communication between wireless device 120 and communication network 101, including standard access nodes such as a macro-cell access node, base transceiver station, a radio base station, an eNodeB device, an enhanced eNodeB device, or the like. In an exemplary embodiment, a macro-cell access node 110 can have a coverage area in the range of approximately five kilometers to thirty-five kilometers and an output power in the tens of watts. Further, access node 110 may comprise any short range, low power, small-cell access nodes such as a microcell access node, a picocell access node, a femtocell access node, or a home eNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106.

Wireless device 120 may be any device, system, combination of devices, or other such communication platform capable of communicating wirelessly with access node 110 using one or more frequency bands deployed therefrom. Wireless device 120 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 120. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path—including combinations thereof. Communication link 106 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication link 106 may include Si communication links. Other wireless protocols can also be used. Communication link 106 can be a direct link or might include various equipment, intermediate components, systems, and networks. Communication link 106 may comprise many different signals sharing the same link.

Gateway node(s) 102 can be any network node configured to interface with other network nodes using various protocols. Gateway node(s) 102 can communicate user data over system 100. Gateway node(s) 102 can be standalone computing devices, computing systems, or network components, and can be accessible, for example, by a wired or wireless connection, or through an indirect connection such as through a computer network or communication network. For example, gateway node(s) 102 can include a serving gateway (S-GW) and/or a public data network gateway (P-GW), etc. One of ordinary skill in the art would recognize that gateway node(s) 102 are not limited to any specific technology architecture, such as Long Term Evolution (LTE) and can be used with any network architecture and/or protocol.

Each of gateway node(s) 102 can comprise a processor and associated circuitry to execute or direct the execution of computer-readable instructions to obtain information. Gateway node(s) 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node(s) 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as associations between different QoS parameters, GBR/non-GBR transmissions, and so on. This information may be requested by or shared with access node 110 via communication link 106, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication systems 100 may be, comprise, or include computers systems and/or processing nodes. This includes, but is not limited to: access node 110, controller node 104, and/or network 101.

Figure 2:
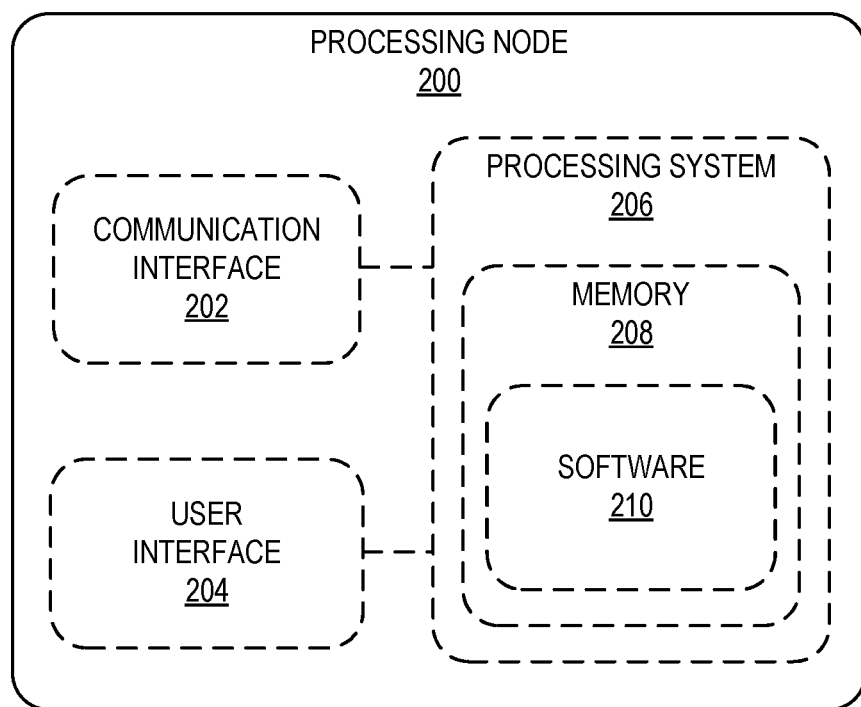
FIG. 2 depicts a schematic of an exemplary processing node for scheduling full-duplex transmissions.

FIG. 2 depicts an exemplary processing node 200 for mitigating interference. Processing node comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store a software 212, which may be executed to perform the interference mitigation operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 can include instructions for scheduling full-duplex transmissions by identifying a one or more flexible symbols within a time slot associated with an air interface resource, wherein the one or more flexible symbols are capable of transmitting both uplink and downlink data simultaneously, and scheduling a first type of transmission in the one or more flexible symbols, wherein the first type of transmission is any transmission that does not have a low latency requirement. In another exemplary embodiment, software 212 can include instructions for scheduling full-duplex transmissions by configuring a time slot of an air interface resource with an uplink portion, a downlink portion, and a flexible portion, wherein the flexible portion is capable of transmitting both uplink and downlink data, and scheduling transmissions that are not delay-sensitive or latency-sensitive in the flexible portion. In another exemplary embodiment, software 212 can include instructions for scheduling full-duplex transmissions by configuring adjacent time slots of an air interface resource with different ratios of uplink portions, downlink portions, and flexible portions, and scheduling transmissions in each adjacent time slot based on whether or not the transmissions are latency-sensitive or delay-sensitive.

Figure 3:
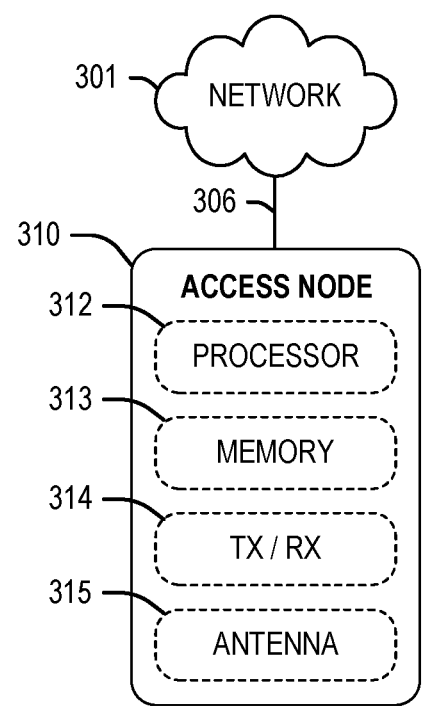
FIG. 3 depicts an exemplary access node for scheduling full-duplex transmissions.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, transceiver 313, and antenna 314. Processor 311 executes instructions stored on memory 312, while transceiver 313 and antenna 314 enable wireless communication with wireless device 330 and relay node 340. Further, antenna 314 may include an array of antennae that are configured to deploy a radio air interface over one or more wireless sectors, form beams within these sectors, employ multiple-input-multiple-output (MIMO), etc.

Further, memory 312 can include a scheduler for scheduling full-duplex transmissions by identifying a one or more flexible symbols within a time slot associated with an air interface resource, wherein the one or more flexible symbols are capable of transmitting both uplink and downlink data simultaneously, and scheduling a first type of transmission in the one or more flexible symbols, wherein the first type of transmission is any transmission that does not have a low latency requirement. In another exemplary embodiment, memory 312 can include a scheduler for scheduling full-duplex transmissions by configuring a time slot of an air interface resource with an uplink portion, a downlink portion, and a flexible portion, wherein the flexible portion is capable of transmitting both uplink and downlink data, and scheduling transmissions that are not delay-sensitive or latency-sensitive in the flexible portion. In another exemplary embodiment, memory 312 can include a scheduler for scheduling full-duplex transmissions by configuring adjacent time slots of an air interface resource with different ratios of uplink portions, downlink portions, and flexible portions, and scheduling transmissions in each adjacent time slot based on whether or not the transmissions are latency-sensitive or delay-sensitive.

Figure 4:
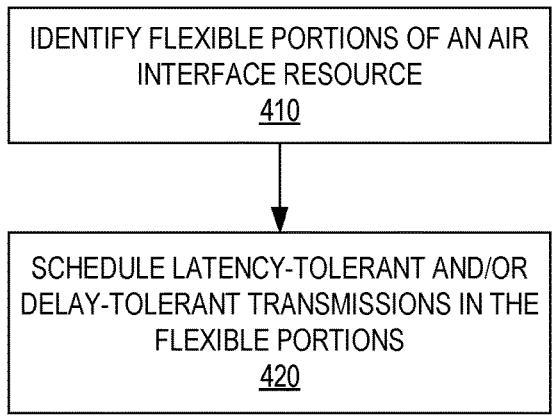
FIG. 4 depicts an exemplary method for scheduling full-duplex transmissions.

FIG. 4 depicts an exemplary method for scheduling full-duplex transmissions. The exemplary method of FIG. 4 may be implemented using components similar to those described above, such as access node 110. Although FIG. 4 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 410, flexible portions are identified in an air-interface resource. An exemplary air interface resource can include frequency-time resources, such as subframes or slots within a subframe. For example, each subframe includes a plurality of time slots, with different subframes having different numbers of timeslots based on a numerology. Further, as illustrated below with reference to FIG. 6, each timeslot has the same number of symbols and different time slots can be configured with different ratios of uplink symbols, downlink symbols, and flexible symbols, i.e. different "slot formats". Thus, in exemplary embodiments, the air interface resource(s) can be configured with different slot formats, depending on the preferences of an operator of the network, and to make TDD operations more efficient and less prone to interference.

Further, as described above, flexible symbols may be susceptible to interference from similar-or-same-frequency transmissions on other channels or networks. Scheduling guaranteed-bit-rate (GBR) transmissions in these flexible portions can reduce a QoS or user experience. Thus, at 420, non-GBR transmissions are scheduled in the flexible symbols. For the purposes of this embodiment, non-GBR transmissions are any transmissions or services that do not require a low-latency or a low-delay, thus may be termed "latency-tolerant" and/or "delay-tolerant" transmissions. These can include multimedia streaming, background data, or any other transmissions that are not associated with a GBR or a minimum QoS, in contrast to other GBR transmissions such as VoIP, VoLTE, ViLTE (video over LTE), control signaling (particularly for GBR and/or eMBB transmissions) that require low latency and/or delay. Thus, the GBR and/or control transmissions can be scheduled on dedicated uplink/downlink symbols instead of flexible symbols. In other words, delay-sensitive, latency-sensitive, or control transmissions are prevented from being scheduled in the flexible portions.

Further, additional air-interface resources can be configured based on real-time measurements of error rates that can reflect how the scheduling of different types of data packets is performed. For example, if certain transmissions are associated with a minimum block error ratio (BLER) requirement. (i.e. the ratio of the number of erroneous blocks received to the total number of blocks sent) the measurements can be used to determine how to configure additional air-interface resources in the wireless network. Additional subframes with different numerologies, and additional slot formats can be used depending on whether or not the aforementioned scheduling methods can continue providing the GBR transmissions described herein. For example, increased numbers of flexible symbols can be configured into future time slots of different formats based on monitoring QFI flows and hybrid automated request (HARQ) transmissions and BLER rates. This can be performed in real-time as the measurements are made and different types of traffic being scheduled in each slot.

Figure 5:
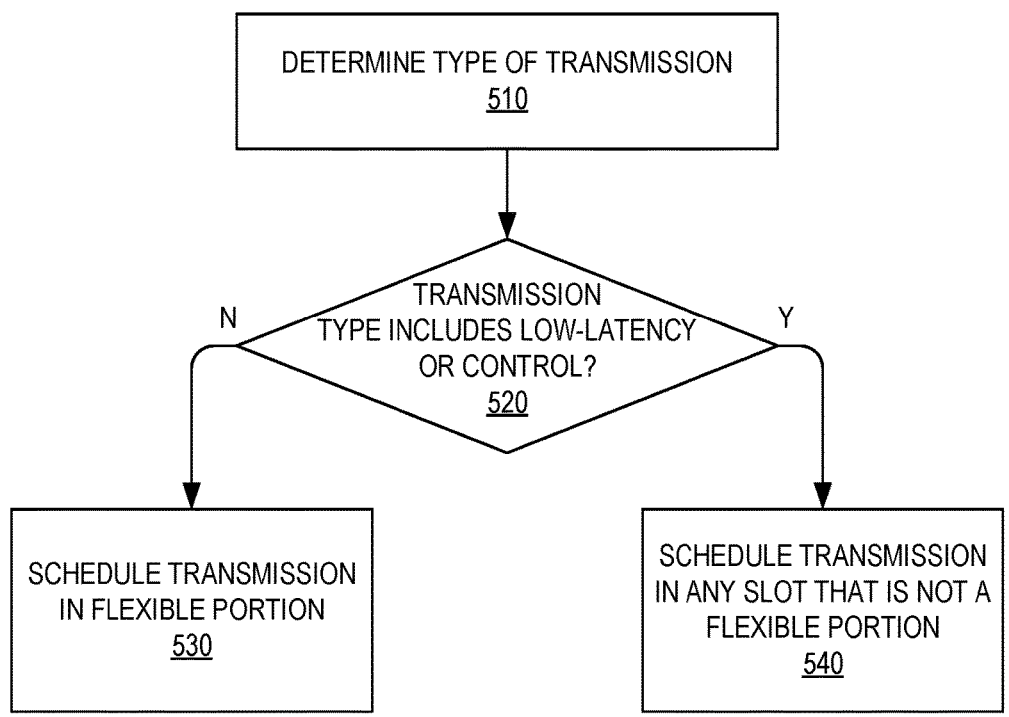
FIG. 5 depicts another exemplary method for scheduling full-duplex transmissions.

FIG. 5 depicts an exemplary method for scheduling full-duplex transmissions. The exemplary method of FIG. 5 may be implemented using components similar to those described above, such as access node 110. Although FIG. 5 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 510, a type of transmission is determined for a transmission between two network nodes, such as a wireless device and an access node. The type of transmission can be determined based on a quality of service (QoS) identifier, and the QoS identifier can be associated with a latency requirement of the transmission. In an exemplary embodiment, the QoS identifier comprises a bearer identifier, a QCI, or a QFI. For example, in 4G LTE networks, QCI values can have different attributes such as priority, packet delay budget, and packet error loss, which can be considered as providing a guaranteed service level for users of wireless devices. Whereas, in 5G, QoS is flow based, in that packets are classified and marked using QFIs that are mapped in to Data Radio Bearers (DRBs) and can be grouped into guaranteed bit rate (GBR) and non-GBR. Thus, at 520, it is determined whether or not the transmission is associated with a low-latency, low-delay, or control transmission, based in part on the aforementioned identifiers of the transmission. At 530, if it is determined that the transmission is not associated with a low-latency, low-delay, or control (in other words, non-GBR), then the transmission is scheduled in a flexible portion of the air-interface resource. Conversely, if it is determined that the transmission is associated with low-latency, low-delay, or control transmission, then the transmission is scheduled in a non-flexible portion the air interface resources (such as dedicated uplink and/or downlink symbols).

Figure 6A:
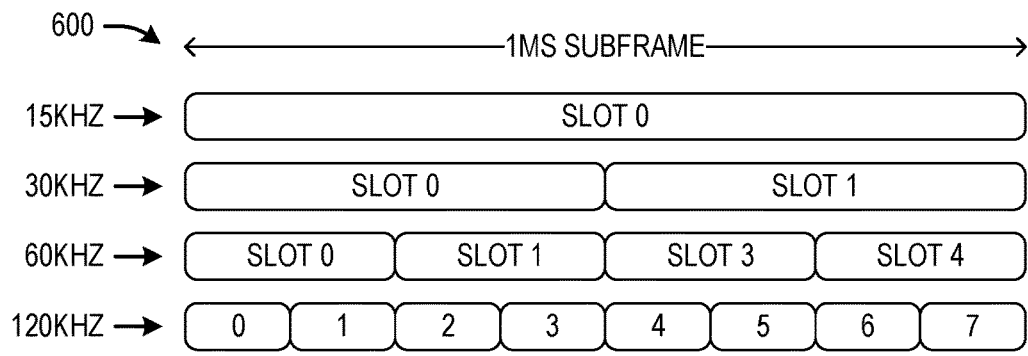
FIGS. 6A-6C depict exemplary time slots comprising flexible portions in which full-duplex transmissions are scheduled.
Figure 6B:
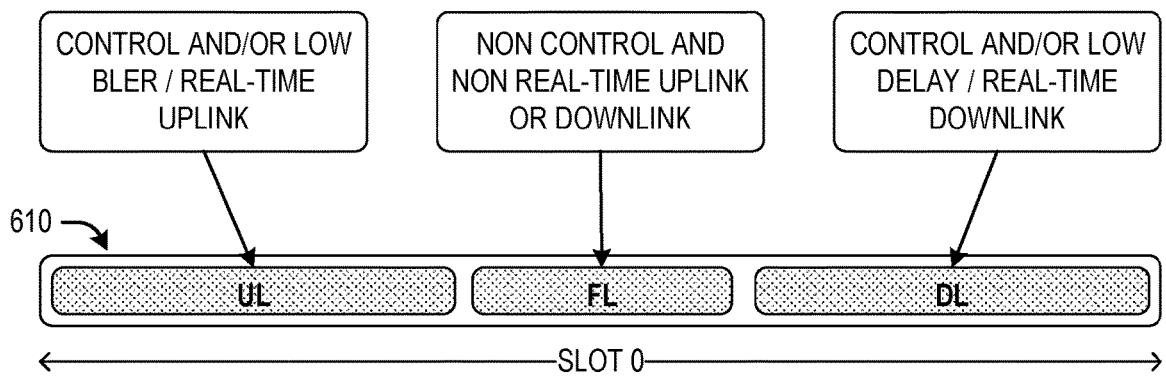
Figure 6C:
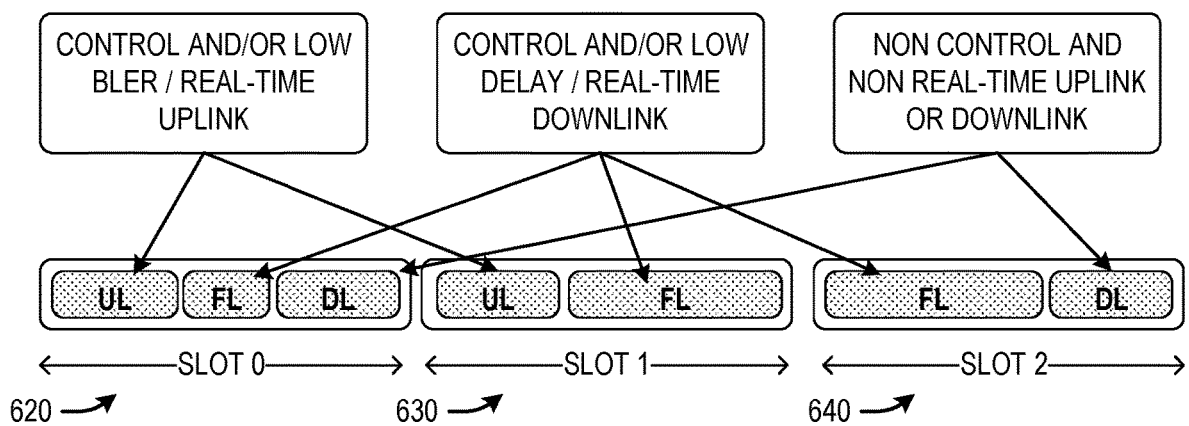

FIGS. 6A-6C depict exemplary time slots comprising flexible portions in which full-duplex transmissions are scheduled. With reference to FIG. 6A, an exemplary air interface is illustrated as a subframe 600 comprising a duration of 1 ms. A subframe is a unit of time during which frequency resources are allocated for wireless transmissions. Further, a 1 ms subframe 600 may be a portion of a larger unit of time, such as a is frame, and so on. While frame structures differ in different types of networks, e.g. LTE, 5G NR, TDD, FDD, etc., for the purposes of this disclosure, a subframe 600 can be comprised of one or more slots, e.g. slot 0, slot 1, slot 2, etc. For example, different subframes have different numbers of slots based on a numerology. Generally, 5G networks have different subcarrier spacings beyond the 15 kHz provided by 4G LTE networks. The subcarrier spacing scales by 2µ×15 kHz to cover different services: QoS, latency requirements and frequency ranges. For example, 15 KHz, 30 KHz, and 60 kHz subcarrier spacings can be used for the lower frequency bands, and 60 KHz, 120 KHz, and 240 kHz subcarrier spacing are used for the higher frequency bands. Further, as illustrated in FIG. 6A, a number of slots within 1 ms subframe 600 increases as numerology (µ) increases. More slots as the frequency increases results in shorter slot duration. In other words, the slot length changes depending on numerology, and gets shorter as subcarrier spacing gets wider, owing to the properties inherent to OFDM wireless air resources.

Regardless, each timeslot has the same number of symbols. Thus, as shown in FIG. 6B, a slot 610 includes a first portion of uplink (UL) symbols, a second portion of flexible (FL) symbols, and a third portion of downlink (DL) symbols. Further, the different time slots can be configured with different ratios of uplink symbols, downlink symbols, and flexible symbols. This concept is referred to as "slot format" which indicates how each symbol within a single slot is used. Whereas in LTE TDD networks, if a subframe (equivalent to a Slot in 5G NR) is configured for downlink or uplink transmissions, all of the symbols within the subframe are used for downlink or uplink respectively. In contrast, in 5G NR, the symbols within a slot can be configured in various ways, i.e. with different ratios of uplink symbols, downlink symbols, and flexible symbols that are arranged adjacent to each other within a single slot 610, as shown in FIG. 6B. Theoretically there may be near-infinite possible combinations of downlink symbols, uplink symbols, and flexible symbols in a slot, $3^{rd}$ generation partnership project (3GPP) provides 61 predefined symbol combinations within a slot, that are referred to as slot formats. The various formats (including different allocations of flexible symbols that can be configured for uplink, downlink, or full-duplex, i.e. simultaneous uplink and downlink transmissions) enable more efficient TDD operation.

Further, as described above, flexible portions may be susceptible to interference from similar-or-same-frequency transmissions on other channels or networks. Thus, any GBR transmission is not scheduled in flexible symbols (UL or DL), while non-GBR transmissions can be scheduled in the flexible symbols (FL). Further, since control signaling, particularly for GBR transmissions and/or enhanced mobile broadband (eMBB) transmissions requires low latency and/or delay, such control transmissions can also be scheduled on dedicated UL/DL symbols instead of flexible (FL) symbols. In other words, delay-sensitive, latency-sensitive, or control transmissions are prevented from being scheduled in the flexible portions. This scheduling system can be applied to various air-interface resources, such as slots 620, 630, and 650 illustrated in FIG. 6C. For example, with reference to FIG. 6C, slot 0 comprises UL, FL, and DL portions in a first format in different amounts (i.e. different numbers of UL, FL, and DL symbols), slot 1 comprises UL and FL symbols in a different format, and slot 640 comprises FL and DL symbols in a different format. Thus, control and/or low block error rate (BLER) and real-time uplink transmissions are scheduled in the dedicated UL portions of each slot 620-640, control and/or low-delay and real-time downlink transmissions are scheduled in the dedicated DL portions of each slot 620-640, and non-control and non-real-time uplink and/or downlink transmissions are scheduled in the FL portions of each slot 620-640.

Further, additional air-interface resources can be configured based on real-time measurements of error rates that can reflect how the scheduling of different types of data packets is performed. For example, if certain transmissions are associated with a minimum block error ratio (BLER) requirement. (i.e. the ratio of the number of erroneous blocks received to the total number of blocks sent) the measurements can be used to determine how to configure additional air-interface resources in the wireless network. Additional subframes with different numerologies, and additional slot formats can be used depending on whether or not the aforementioned scheduling methods can continue providing the GBR transmissions described herein. For example, increased numbers of flexible symbols can be configured into future time slots of different formats based on monitoring QFI flows and hybrid automated request (HARQ) transmissions and BLER rates. This can be performed in real-time as the measurements are made and different types of traffic being scheduled in each slot.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for scheduling full-duplex transmissions, the method comprising:
   executing computer readable instructions using a processor to perform multiple operations, the operations including;
   identifying one or more flexible symbols within a time slot associated with an air interface resource, the one or more flexible symbols transmitting both uplink and downlink data simultaneously and at least one dedicated uplink or dedicated downlink symbol different from the flexible symbols;
   identifying a first type of transmission based on an identifier associated with the transmission, wherein the first type of transmission does not have a low latency requirement;

scheduling the first type of transmission, based on the identification, in the one or more flexible symbols transmitting both uplink and downlink data simultaneously;

identifying a different type of transmission based on the identifier associated with the transmission, the different type of transmission having a low latency requirement; and scheduling the different type of transmission, based on the identification, in the dedicated uplink or dedicated downlink symbol.

2. The method of claim 1, further comprising scheduling a second type of transmission in the one or more flexible symbols, wherein the second type of transmission is any transmission not associated with control signaling.

3. The method of claim 1, wherein the different type of transmission is a third type of transmission, the third type of transmission being any transmission that has a low latency requirement.

4. The method of claim 3, wherein the third type of transmission further comprises any transmission that is delay sensitive.

5. The method of claim 1, further comprising scheduling control transmissions in any of the one or more uplink symbols or the one or more downlink symbols.

6. The method of claim 1, further comprising determining the type of transmission based on a quality of service (QoS) identifier.

7. The method of claim 6, wherein the QoS identifier is associated with a latency requirement of the transmission.

8. The method of claim 6, wherein the QoS identifier comprises a QoS flow identifier (QFI).

9. The method of claim 1, wherein:
the air interface resource comprises a subframe, and
the time slot is one of a plurality of time slots within the subframe.

10. A method for scheduling full-duplex transmissions, the method comprising:
executing computer readable instructions using a processor to perform multiple operations, the operations including:
configuring a time slot of an air interface resource with an uplink portion, a downlink portion, and a flexible portion, wherein the flexible portion transmits both uplink and downlink data simultaneously;
identifying transmissions that are not delay-sensitive or latency-sensitive based on an identifier associated with the transmission and transmissions that are latency-sensitive or delay-sensitive based on the identifier; and
scheduling the identified transmissions that are not delay-sensitive or latency-sensitive in the flexible portion transmitting both uplink and downlink data simultaneously and the transmissions that are delay-sensitive or latency-sensitive in the dedicated uplink portion or the dedicated downlink portion.

11. The method of claim 10, further comprising scheduling control transmissions in the uplink or downlink portions.

12. The method of claim 10, further comprising determining whether or not a transmission is delay-sensitive or latency-sensitive based on a Quality of Service (QoS) identifier associated with the transmission.

13. The method of claim 12, wherein the QoS identifier comprises a QoS flow identifier (QFI).

14. The method of claim 10, further comprising:
monitoring BLER rates and configuring adjacent time slots of the air interface resource with different ratios of uplink portions, downlink portions, and flexible portions based on the monitored BLER rates; and
scheduling transmissions in each adjacent time slot based on whether or not the transmissions are latency-sensitive or delay-sensitive.

15. A system for scheduling full-duplex transmissions, the system comprising:
a processing node; and
a processor coupled to the processing node the processor configured to perform operations comprising:
configuring adjacent time slots of an air interface resource with different ratios of dedicated uplink portions, dedicated downlink portions, and flexible portions transmitting both uplink and downlink data simultaneously;
identifying transmissions that are not delay-sensitive or latency-sensitive based on an identifier associated with the transmissions; and
scheduling the identified transmissions, based on the identification, in the flexible portions transmitting both uplink and downlink data simultaneously and scheduling other transmissions that are delay-sensitive or latency-sensitive in the dedicated uplink portions and dedicated downlink portions.

16. The system of claim 15, wherein:
the air interface resource comprises a subframe,
the uplink portions, downlink portions, and flexible portions comprise symbols, and
the different ratios of uplink portions, downlink portions, and flexible portions are based on a numerology associated with the subframe.

17. The system of claim 15, wherein the operations further comprise scheduling transmissions in each adjacent time slot based on whether or not the transmissions are control transmissions.

* * * * *